United States Patent [19]
Englander

[11] Patent Number: 6,149,039
[45] Date of Patent: *Nov. 21, 2000

[54] BICYCLE CARRIER

[75] Inventor: Curt Englander, Hillerstorp, Sweden

[73] Assignee: Industri AB Thule, Gotedorg, Sweden

[ * ] Notice: Under 35 U.S.C. 154(b), the term of this patent shall be extended for 555 days.

[21] Appl. No.: 08/517,198

[22] Filed: Aug. 21, 1995

Related U.S. Application Data

[63] Continuation of application No. 08/117,690, Sep. 8, 1993, abandoned.

[30]  Foreign Application Priority Data

Sep. 8, 1992 [SE] Sweden ................................. 9202588

[51] Int. Cl.⁷ ............................ B60R 9/042; B60R 9/048
[52] U.S. Cl. ......................... 224/310; 224/324; 224/924; 414/462
[58] Field of Search ............................. 224/310, 42.03 B, 224/324, 309, 321, 42.03 R, 42.21, 502, 504, 505, 924; 414/462

[56]  References Cited

U.S. PATENT DOCUMENTS

| | | |
|---|---|---|
| 2,521,815 | 9/1950 | Will ........................................ 224/505 |
| 2,576,222 | 11/1951 | Hill . |
| 2,800,264 | 7/1957 | McFadyen .............................. 224/504 |
| 2,803,349 | 8/1957 | Talbot . |
| 3,204,839 | 9/1965 | Yuda et al. . |
| 3,687,318 | 8/1972 | Casey et al. . |
| 3,848,784 | 11/1974 | Shimano et al. . |
| 3,861,533 | 1/1975 | Radek . |
| 3,901,421 | 8/1975 | Kalicki et al. . |
| 3,931,919 | 1/1976 | Gerber et al. . |
| 3,994,425 | 11/1976 | Graber . |
| 4,015,760 | 4/1977 | Bott . |
| 4,039,106 | 8/1977 | Graber . |
| 4,089,448 | 5/1978 | Traeger ................................. 224/924 |
| 4,132,335 | 1/1979 | Ingram . |
| 4,139,110 | 2/1979 | Roberts ................................. 224/310 |
| 4,442,961 | 4/1984 | Bott . |
| 4,717,054 | 1/1988 | Vanzant .................................. 224/504 |
| 4,767,038 | 8/1988 | McVicar ................................. 224/505 |
| 5,108,018 | 4/1992 | Spinka ............................. 224/42.03 R |
| 5,284,282 | 2/1994 | Mottino ................................. 224/310 |

FOREIGN PATENT DOCUMENTS

| | | |
|---|---|---|
| 0 363 692 | 4/1990 | European Pat. Off. . |
| 0563463 A1 | 10/1993 | European Pat. Off. . |
| 2 377 317 | 8/1978 | France . |
| 2 411 109 | 7/1979 | France . |
| 2 430 873 | 2/1980 | France . |
| 33 35 173 | 4/1985 | Germany . |
| 35 13 085 | 10/1986 | Germany . |
| 39 12 692 | 11/1989 | Germany . |
| 38 20 382 | 12/1989 | Germany . |
| 4122823 A1 | 1/1993 | Germany . |
| 94/03345 | 2/1994 | WIPO . |

OTHER PUBLICATIONS

Universal–Lastenträger, Grundmodel mit Zubehör, Klein Metal, Saison 79–80.

Universal–Lastenträger, Lastenträger–System '80, Autoteile Ravensburg, Stand Apr. '80.

*Primary Examiner*—Linda J. Sholl

[57]  ABSTRACT

An apparatus for carrying a bicycle on a vehicle roof comprises two load carrying struts (4, 5) secured on the vehicle roof and each having an anchorage (6) for fixedly securing legs (8) on a yoke (8, 10). The yoke (8, 10) has, on its horizontal portion (10), anchorages (3, 15) for fixedly retaining the bicycle. The yoke (8, 10) is, via joints (9), pivotal about an axis in the longitudinal direction of the vehicle between an upstanding transport position above the vehicle and a laterally outwardly pivoted loading and unloading position in which the anchorages (3, 15) are located laterally outside the side of the vehicle and flush with the load carrying struts (4, 5). At least the one anchorage (6) on the load carrying struts (4, 5) is provided with a spring (12) which facilitates upward pivoting of the yoke (8, 10) to the transport position.

2 Claims, 4 Drawing Sheets

BICYCLE CARRIER

This application is a continuation of application Ser. No. 08/117,690, filed on Sep. 8, 1993, now abandoned.

TECHNICAL FIELD

The present invention relates to an apparatus for carrying a bicycle on a vehicle roof, comprising a carrier device secured on the vehicle roof and a holder secured in the carrier device, the holder having engagement members for fixing cooperation with the bicycle.

BACKGROUND ART

Numerous different types of bicycle carriers are previously known in the art for transporting bicycles on vehicle roofs. Common to most of these is that they include two mutually approximately parallel load carrying struts which are secured in opposing edges of the vehicle roof. In one such bicycle carrier, there is provided a support rail which is disposed above the load carrier struts and extends longitudinally in relation to the vehicle and in which the wheels of the bicycle are placed. For fixedly retaining the bicycle on the support rail, use is then made of a holder which grasps about the frame tube of the bicycle ahead of and slightly above the crank portion.

In other types of bicycle carriers, special anchorages are provided on the above-mentioned load carrying struts for fixedly screwing, for example, the front fork of the bicycle after the front wheel has been removed. For cooperation with the rear wheel of the bicycle, use is made of a shorter, gutter-shaped portion in which the wheel is lashed in place.

In yet a further type of bicycle carrier, use is made of a holder on the one load carrying strut, this holder grasping about the handlebars of the bicycle when the bicycle is turned upside down, while a corresponding holder is provided for cooperation with the saddle of the bicycle.

Common to all of the above-described prior art bicycle carriers is the serious drawback that one person alone can hardly lift up the bicycle onto the vehicle roof and, at the same time, mount the bicycle in place in the holder. Thus, in practice two people are needed for loading and unloading bicycles if damage to the bicycles or the vehicle roof itself is to be reliably avoided.

PROBLEM STRUCTURE

The present invention has for its object to realise an apparatus or carrier of the type mentioned by way of introduction, the carrier being designed in such a manner as to obviate the shortcomings inherent in prior art technology and permit a very simple and convenient loading and unloading of the bicycle, even by one person alone. The present invention further has for its object to realise an apparatus or carrier which permits reliable transport of the bicycle and which, in itself, is easy to mount in place on and dismount from the vehicle roof. The present invention yet further has for its object to realise an apparatus which is simple and economical to manufacture.

SOLUTION

The objects forming the basis of the present invention will be attained if the apparatus intimated by way of introduction is characterized in that the holder is pivotal, about an axis which is approximately parallel with the longitudinal direction of the vehicle and is approximately horizontal, between an upwardly directed transport position above the vehicle and a loading and unloading position outwardly pivoted in the lateral direction in which the engagement members are at a lower height than in the transport position.

By rendering, in this manner, the holder pivotal between a substantially vertical transport position in which the bicycle stands upright on the vehicle roof, and a position outwardly pivoted in a lateral direction approximately through 90° in which the engagement members of the holder are located on a level with the upper edge of the vehicle roof or even below this level and outside the vehicle body side seen in the lateral direction, the major advantage will be afforded that the height to which the bicycle must be lifted on mounting and dismounting has been considerably reduced as compared with prior art designs and constructions. Furthermore, the engagement members are disposed out a distance beside the vehicle body so that the risk of damage to the vehicle body is substantially reduced.

According to one preferred embodiment, it further also suitably applies that the carrier device includes at least one carrier member which extends across the vehicle roof and which, at opposing side edge regions of the vehicle roof, is secured therein, and that the carrier has legs which are downwardly directed from the engagement members in the transport position and which, via pivot members, are connected to the carrier device.

These design and construction features afford the major advantage that standard components in the form of conventional load carrying struts and their associated support feet may be employed together with the carrier device.

BRIEF DESCRIPTION OF THE ACCOMPANYING DRAWINGS

The present invention will now be described in greater detail hereinbelow, with particular reference to the accompanying Drawings. In the accompanying Drawings, FIG. 1 is a perspective view of the subject matter of the present invention with a bicycle mounted thereon in the transport position;

DESCRIPTION OF PREFERRED EMBODIMENT

Figure 1:
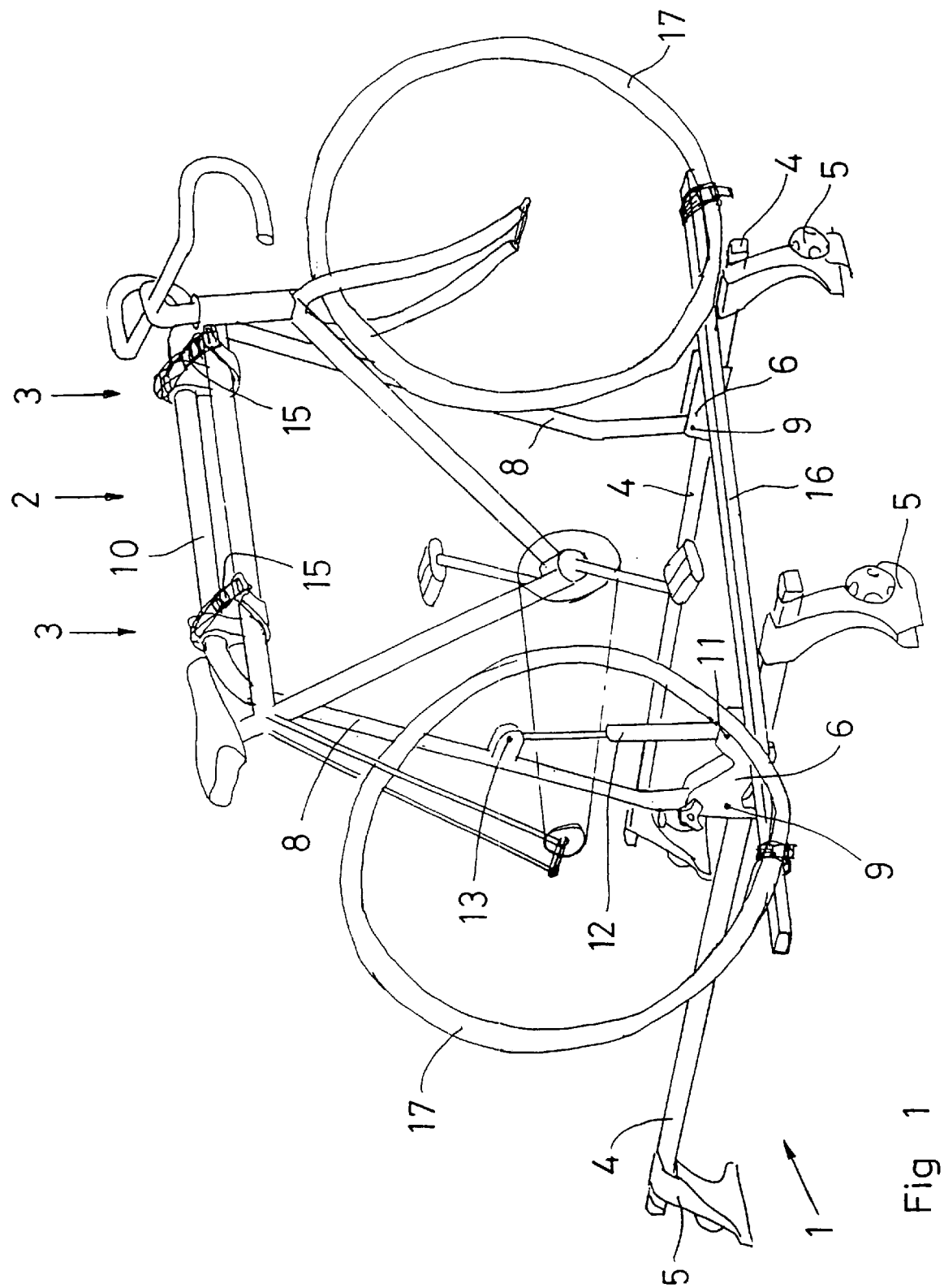

The carrier according to the present invention comprises a carrier device secured on a vehicle roof a slight distance above the roof, the device having suitable means for fixing at the side edge regions of the vehicle roof or in the transitional regions of the vehicle roof with the vehicle sides. In FIG. 1, this carrier device has been given the general reference numeral 1. The carrier device 1 has a pivotal anchorage for a holder 2 which, at its upper end, has engagement members 3 for positionally fixing cooperation with the bicycle for carrying and retaining the bicycle. The pivot axis of the holder 2 is approximately parallel with the longitudinal axis of the vehicle and substantially horizontal. This implies that the holder is pivotal between an upstanding, load carrying position and a position projecting laterally at approximately 90°—a loading and unloading position—in which the engagement members 3 are located at a considerably lower height than in the transport position and, moreover, laterally outside the vehicle body side.

The carrier device 1 includes, in the illustrated embodiment, two mutually substantially parallel load carrier struts 4 which extend transversely across the vehicle roof and which, in their opposing ends, have feet 5 for fixedly securing on the vehicle roof or its transition region with the vehicle sides. Both the load carrier struts 4 and the feet 5 may be of conventional type and, thus, may be used also in other contexts.

Each load carrier strut 4 has a pivotal anchorage 6 mounted thereon for the pivotal securement of the holder 2. Both of the anchorages 6 are designed in such a manner that they straddle the load carrier struts 4 and are fixable on these struts by means of suitable anchorage devices 7 in positions which are adjustable in the longitudinal direction of the load carrier struts. The holder 2 includes two mutually approximately parallel legs 9 which, in their lower ends, are secured in the two anchorages 6 by means of joints 9. The upper ends of the legs 8 are interconnected with one another via an approximately horizontal portion 10 so that, thereby, the holder will have the form of an inverted U. The horizontal portion 10 carries the engagement members 3.

It will be obvious that the opposing ends of the load carrier struts 4 can also be provided with anchorages 6 and a holder 2 so that bicycles may thereby be transported on both sides of the vehicle.

Figure 2:
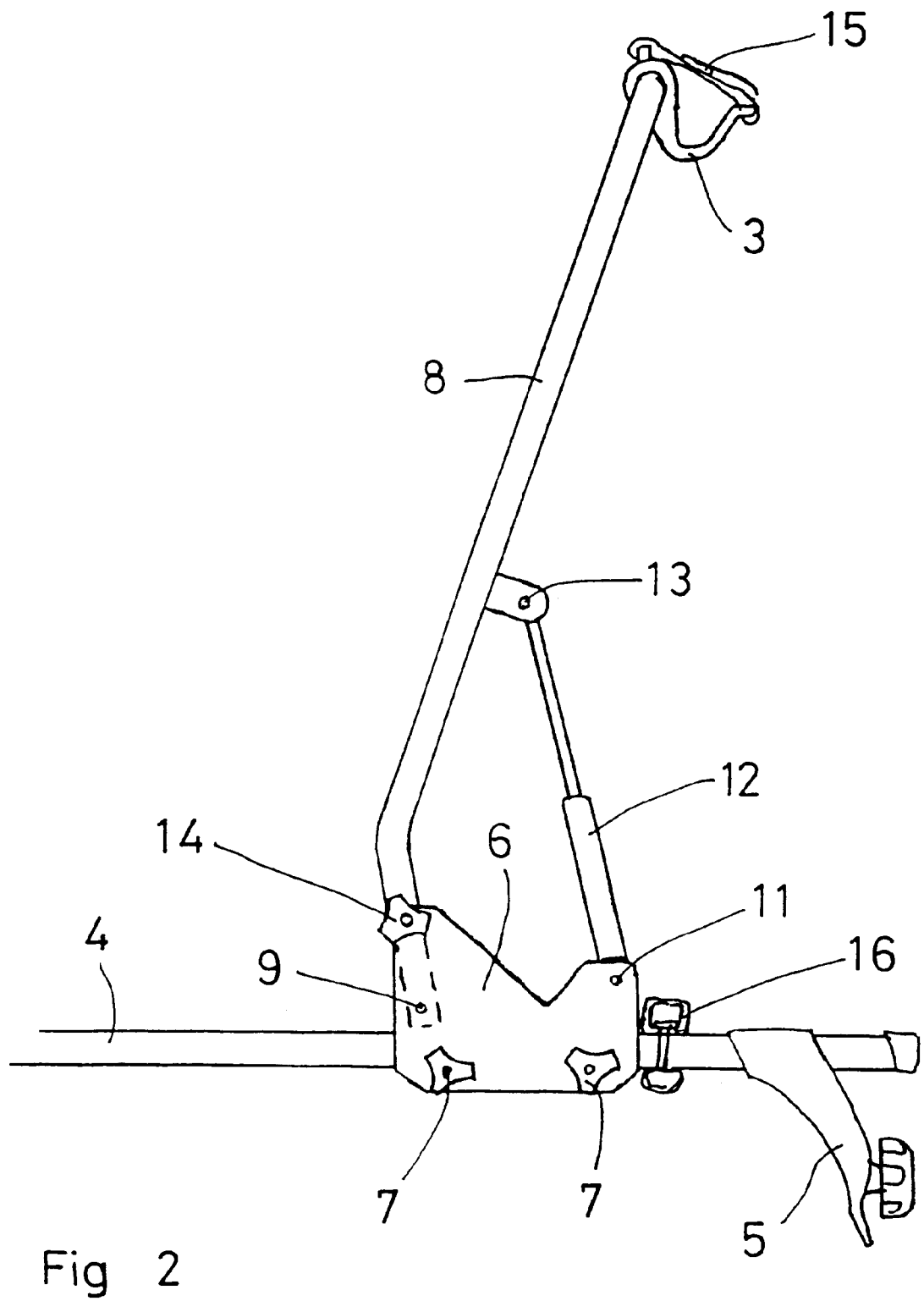
FIG. 2 is a view from the rear of the right-hand side of the subject matter of the present invention in the transport position.
Figure 3:
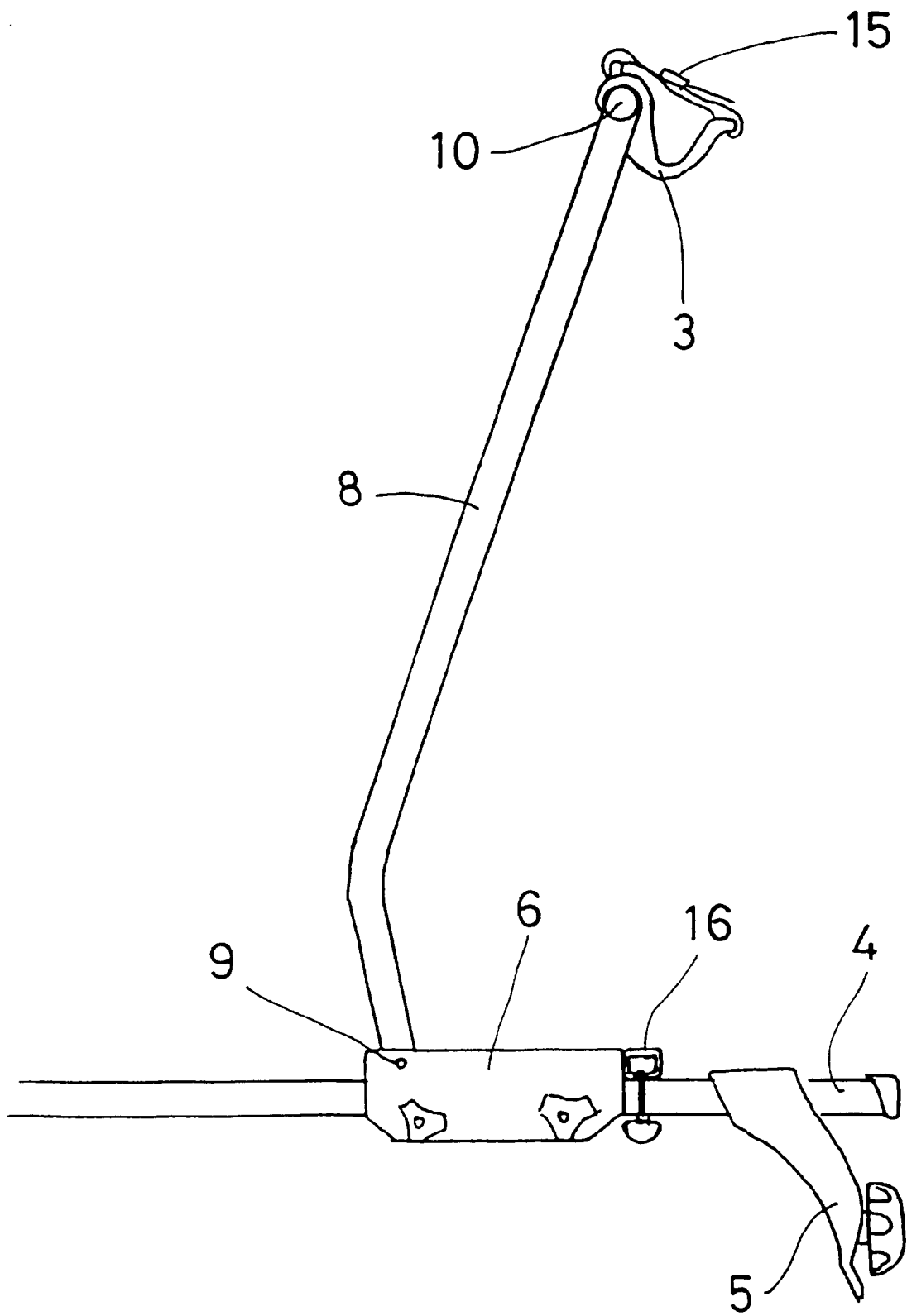
FIG. 3 is a view of the front load carrier strut of the subject matter of the present invention, seen from the rear.
Figure 4:
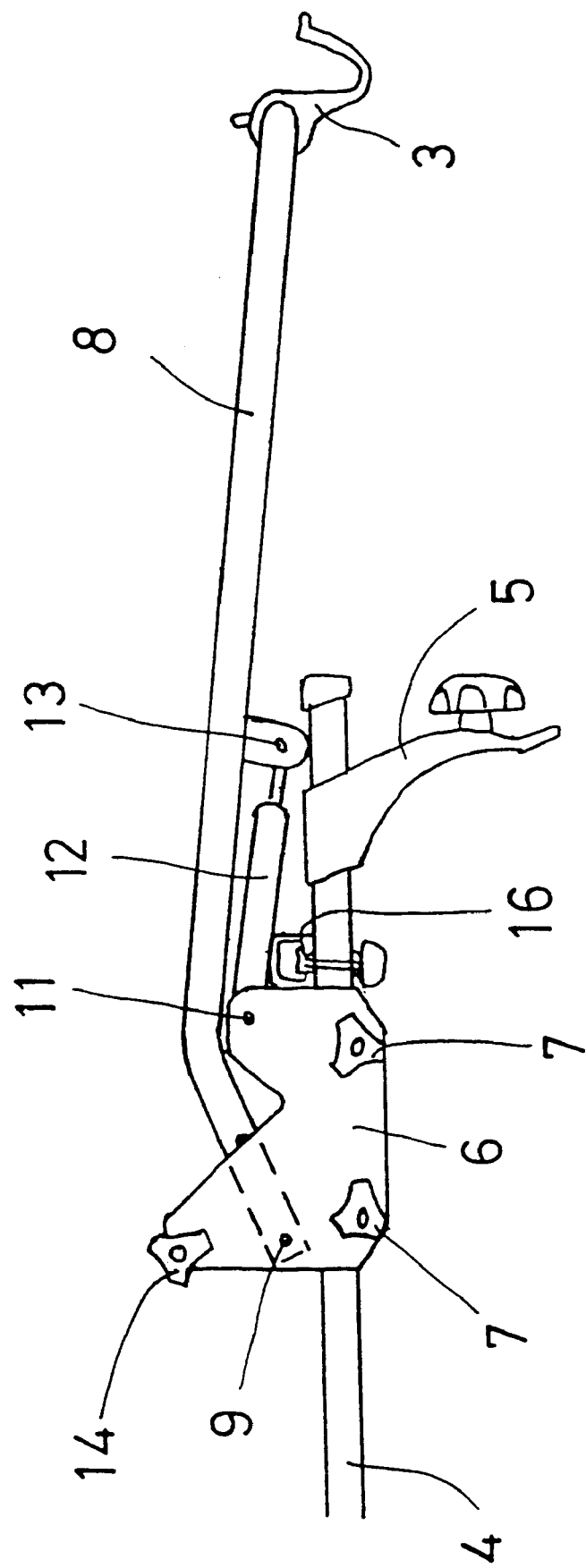
FIG. 4 shows the subject matter of the present invention seen from the rear, in the loading and unloading position.

FIGS. 2 and 4 show how the holder 2 is pivotal between the upstanding transport position shown in FIG. 2 and the laterally outwardly pivoted loading and unloading position shown in FIG. 4, in which the holder is approximately horizontal or even slightly downwardly directed. It will further be apparent from FIG. 4 that the engagement members 3 of the holder are located laterally outside the foot 5, which retains the carrier according to the present invention in the edge region of the vehicle roof, from which it follows that the engagement members 3 are located laterally a distance beyond the side of the vehicle.

At least the rear anchorage 6 in FIG. 1 is provided, in addition to the joint 9, also with a pivotal mount 11 for spring means 12, preferably a gas spring. The opposite end of the gas spring 12 is, via a pivotal mount 13, connected to the legs 8 of the holder 2 and hereby strives, within the greater portion of its pivotal arc, to pivot the holder in a counterclockwise direction in FIG. 2, i.e. towards the transport position. However, it will be apparent from FIG. 4 that a straight line between the pivot axis or joint 9 of the holder 2 and the upper mount 13 of the spring means 12 is located below the lower mount 11 of the spring means 12. The consequence of this will be that, in the position according to FIG. 4 (i.e. in the loading and unloading position), the spring means 12 strives to pivot the holder in a clockwise direction, i.e. to retain the holder in the loading and unloading position.

When a bicycle is lifted onto the engagement members 3 in the loading and unloading position, there is, thus, no risk that the holder 2 spontaneously pivots upwardly towards the transport position. Only when the holder and the bicycle suspended thereon are manually raised so far that the lower mount 11 of the spring means arrives at a position on or above the connecting line between the joints 9 and the mount 13 will the spring means 12 commence to strive to continue the pivotal movement up towards the transport position. This entails that raising or upward pivoting of the bicycle to the transport position is greatly facilitated.

In order to prevent the holder 2 from being pivoted past the transport position, at least the one anchorage 6, but preferably both anchorages, are provided with an arrest abutment which restricts pivoting past the transport position. Furthermore, at least the one anchorage is provided with a locking device 14 in the form of a threaded stub shaft which may be screwed into the leg 8 and which locks the leg 8 fast in the transport position.

On the Drawing, the engagement members 3 have been shown as upwardly open catches on which the frame of the bicycle can be suspended. In order to prevent the bicycle from unintentionally leaving the engagement with the engagement members 3, these are provided with clamping straps 15 or other fixedly retaining devices which can be tightened about the bicycle frame. Furthermore, the carrier according to the present invention includes a longitudinal holder rail 16 which is substantially parallel with the longitudinal direction of the vehicle and is thereby also approximately parallel with the horizontal portion 10 of the holder 2 and its pivot axis. This holder rail 16 is of such length that it extends, in the longitudinal direction of the vehicle, ahead of the forward load carrier strut 4 and behind the rear load carrier strut 4 in order there to serve for anchoring lower portions of the wheels 17 of the bicycle, for example by clamping straps.

According to the present invention, both of the engagement members 3 should be displaceable or adjustable in the longitudinal direction of the approximately horizontal portion 10 of the holder 2, whereby adaptation to fit different frame types or frame sizes is possible. By way of alternative or as a complement, it is also possible to design the horizontal portion 10 of the holder 2 to be telescopically adjustable so that, thereby, the effective length can be varied in dependence upon the size and appearance of the bicycle frame in question. Correspondingly, the downwardly directed legs 8 of the holder 2 may be telescopic in order to permit adaptation to bicycles of different heights.

DESCRIPTION OF ALTERNATIVE EMBODIMENTS

In such situations in which the overhang of the bicycle carrier outside the vehicle body side is to be maximized, it is possible to place the pivot shaft of the holder 2 in the end of the anchorages 6 located most proximal the vehicle side and, at the same time, to place the spring means on the opposing side (the inside, in towards the longitudinal centre line of the vehicle). As a result, the pivot axis of the holder will be located closer to the side of the vehicle so that, thereby, the projection of the holder outside the side of the vehicle is maximized.

The above-described carrier has been designed for carrying but a single bicycle. If the engagement members 3 or upwardly open catches shown on the Drawings are replaced by arms which project laterally approximately horizontally in the transport direction, these may make room for transport of two bicycles side-by-side. Such arms must be pivotal about an axis which is parallel with or coincides with the centre axis of the horizontal portion 10 of the holder 2 and, moreover, steadied by a strut or stay arrangement which holds these arms in approximately horizontal position irrespective of the pivotal position of the holder 2. For example, a parallelogram anglepoise arrangement for these arms can be employed.

In order further to reinforce the carrier according to the present invention, it is possible to secure, in the upper portion 10 of the holder 2, a stanchion which, in the transport position, grasps over and on the outside of the frame of the bicycle and which, with lower portions, is located on the outside of the bicycle and, with its lower end, may be secured in the holder rail 16, the load carrier strut 4 or the anchorage 6. With such a design and construction, the bicycle will be located interiorly in a closed triangle in which the one side of the triangle consists of the legs 8 of the holder, the second side of the triangle consists of the above-mentioned stanchion and the base of the triangle consists of the anchorage 6, the load carrier strut 4, the carrier device 1 or the rail 16.

The present invention may be further modified without departing from the spirit and scope of the appended Claims.

What is claimed is:

1. An apparatus for carrying a bicycle on a vehicle roof, comprising:

a carrier device, the carrier device being mountable on a vehicle roof and including a pair of cross rails extending transversely across the vehicle roof; and a holder, the holder having at least one leg connected to a horizontal portion, the leg being pivotally attached to one of the cross rails of the carrier device, the holder having engagement members mounted on the horizontal portion for securing the bicycle, the holder being pivotal about a substantially horizontal pivot axis, the pivot axis being substantially parallel to a longitudinal direction of the vehicle, the holder being pivotally between an upwardly directed transport position above the vehicle and a loading and an unloading position directed outwardly in a lateral direction in which the engagement members are at a lower height than in the transport position, means for urging the holder to the transport position from the loading and unloading position, the urging means including at least one resilient means attached between the holder and the carrier device, when the holder is in the loading and unloading position, the resilient means acting to pivot the holder in a clockwise direction to urge the holder to be retained in the loading and unloading position.

2. A bicycle holder mountable on a carrier device on a vehicle, comprising:

at least one leg having a first and a second end, said first end of said leg being pivotally mounted to the carrier device and said leg being pivotable between a substantially upright transport position and a lowered loading position, said transport position being above a predetermined angle of pivotation and said loading position being below said predetermined angle of pivotation;

an engagement member near the second end of said leg for securing a bicycle thereto; and a spring coupled to said leg, said spring arranged to urge said leg toward the transport position when said leg is above said predetermined angle of pivotation and to urge said leg toward the loading position when the leg is below said predetermined angle of pivotation.

* * * * *